US012072765B2

(12) United States Patent
Alkalay et al.

(10) Patent No.: US 12,072,765 B2
(45) Date of Patent: Aug. 27, 2024

(54) FLEXIBLE RAID SCHEME ALLOWING FAST REBUILD

(71) Applicant: Dell Products L.P., Round Rock, TX (US)

(72) Inventors: Amitai Alkalay, Kadima (IL); Vladimir Shveidel, Pardes-Hana (IL); Lior Kamran, Richon LeZion (IL)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 17/730,388

(22) Filed: Apr. 27, 2022

(65) Prior Publication Data

US 2023/0350752 A1 Nov. 2, 2023

(51) Int. Cl.
*G06F 11/10* (2006.01)
*G06F 9/30* (2018.01)

(52) U.S. Cl.
CPC ...... *G06F 11/1092* (2013.01); *G06F 9/30029* (2013.01)

(58) Field of Classification Search
None
See application file for complete search history.

(56) References Cited

U.S. PATENT DOCUMENTS

| 6,223,252 | B1 | 4/2001 | Bandera et al. |
| 7,827,351 | B2 | 11/2010 | Suetsugu et al. |
| 8,145,840 | B2 | 3/2012 | Koul et al. |
| 8,578,094 | B2 | 11/2013 | Chambliss et al. |
| 8,832,528 | B2 * | 9/2014 | Thatcher ........... H03M 13/6502 |
| | | | 714/766 |
| 8,839,028 | B1 | 9/2014 | Polia et al. |
| 9,990,263 | B1 | 6/2018 | Tian et al. |
| 11,269,726 | B2 * | 3/2022 | Xu ...................... G06F 11/1076 |
| 11,379,326 | B2 | 7/2022 | Dong et al. |
| 2019/0121698 | A1 * | 4/2019 | Xu ...................... G06F 11/2094 |
| 2023/0153019 | A1 * | 5/2023 | Ma ........................ G06F 3/0632 |
| | | | 711/103 |
| 2023/0350611 | A1 * | 11/2023 | Alkalay ................. G06F 3/061 |

FOREIGN PATENT DOCUMENTS

| WO | WO-9917212 A1 * | 4/1999 | .......... G06F 11/1076 |
| WO | WO-2018231350 A1 * | 12/2018 | .......... G06F 11/1435 |

OTHER PUBLICATIONS

Alkalay, Amitai, et al.; "Flexible RAID Scheme Allowing Fast Rebuild," U.S. Appl. No. 17/730,837, filed Apr. 27, 2022.

* cited by examiner

*Primary Examiner* — Guerrier Merant
(74) *Attorney, Agent, or Firm* — BainwoodHuang

(57) ABSTRACT

A technique protects user data within a storage system. The technique involves, in response to a request signal that directs the storage system to store the user data, generating first parity and second parity based on the user data. The technique further involves storing the first parity and the user data in a data uber of the storage system, the data uber providing redundant array of independent disks (RAID) protection. The technique further involves storing the second parity in designated free storage of the storage system, the designated free storage being separate from the data uber.

20 Claims, 6 Drawing Sheets

FLEXIBLE RAID SCHEME ALLOWING FAST REBUILD

BACKGROUND

Typically, a conventional data storage system protects host data using a redundant array of independent disks (RAID) data protection scheme. Example RAID protection schemes include RAID5(4+1), RAID5(8+1), RAID6, and RAID10.

By way of example, when a conventional data storage system protects host data using RAID5(8+1), the data storage system writes eight data segments and one parity segment across nine different storage units. To create the parity segment, the data storage system performs a bitwise XOR operation across all of the eight data segments. After the parity segment is created and all of the segments are written to the storage units, if one of the data segments is lost (e.g., due to a storage unit failure), the data storage system reconstructs the lost data segment from all of the remaining data segments (i.e., seven data segments) and the parity segment.

SUMMARY

Unfortunately, there are deficiencies to the above-described conventional data storage system. Along these lines, when a data segment is lost in the RAID5(8+1) example described above, the conventional data storage system rebuilds the lost data segment by reading all of the remaining seven data segments and the parity segment from eight different storage units, and then calculating the lost data segment from the remaining seven data segments and the parity segment. This operation may take considerable time (e.g., due to loading, resource contention, etc.) and, during this time, data storage system performance is degraded. Moreover, the conventional data storage system is less reliable since data loss could result if a second storage unit fails during this time.

One alternative is to replace the RAID5(8+1) data protection scheme with a RAID5(4+1) data protection scheme. Here, the data storage system would write four data segments and one parity segment across five different storage units. To create the parity segment, the data storage system would perform a bitwise XOR operation across all four data segments. After the parity segment is created and all of the segments are written to the storage units, if one of the data segments were lost (e.g., due to a storage unit failure), the conventional data storage system would be able to reconstruct the lost data segment from the remaining three data segments and the parity segment. Since only three data segments are read using the RAID5(4+1) data protection scheme rather than seven using the RAID5(8+1) data protection scheme, rebuild time using the RAID5(4+1) data protection scheme is shorter.

However, the RAID5(4+1) data protection scheme uses more storage space for parity than the RAID5(8+1) data protection scheme. In particular, the RAID5(4+1) data protection scheme requires one parity segment for every four data segments, while the RAID5(8+1) data protection scheme requires one parity segment for every eight data segments. Accordingly, the RAID5(4+1) data protection scheme is less efficient from a storage utilization perspective.

In contrast to the above-described conventional data storage system, improved techniques are directed to a flexible RAID scheme that allows fast storage system rebuild. The flexible RAID scheme involves generating multiple parity segments from the data segments in use. A first parity segment is generated from all of the data segments in use (e.g., from eight data segments if RAID5(8+1) is used) and stored in the RAID stripe. A second parity segment is generated from half of the data segments in use and stored in designated free storage which is available (or free) for use for other purposes within the storage system. If a segment of the RAID stripe is lost (e.g., due to a storage device failure), the lost segment may be rebuilt from half the number of data segments in use and the remaining parity. Since only half the number of data segments need to be read during rebuild, storage system performance is less degraded compared to a situation in which all of the data segments are read. Additionally, since it takes less time to read only half the number of data segments, rebuild duration is shorter so storage system reliability is improved. Furthermore, the second parity segment is simply provided for best efforts use, and the designated free storage that stores the second parity segment is available for other uses by the storage system thus providing improved storage efficiency.

One embodiment is directed to a method of protecting user data within a storage system. The method includes, in response to a request signal that directs the storage system to store the user data, generating first parity and second parity based on the user data. The method further includes storing the first parity and the user data in a data uber of the storage system, the data uber providing redundant array of independent disks (RAID) protection. The method further includes storing the second parity in designated free storage of the storage system, the designated free storage being separate from the data uber.

Another embodiment is directed to storage system equipment which includes memory, and control circuitry coupled to the memory. The memory stores instructions which, when carried out by the control circuitry, cause the control circuitry to perform a method of:

- (A) in response to a request signal that directs a storage system to store the user data, generating first parity and second parity based on user data,
- (B) storing the first parity and the user data in a data uber of the storage system, the data uber providing redundant array of independent disks (RAID) protection, and
- (C) storing the second parity in designated free storage of the storage system, the designated free storage being separate from the data uber.

Yet another embodiment is directed to a computer program product having a non-transitory computer readable medium which stores a set of instructions to protect user data within a storage system. The set of instructions, when carried out by computerized circuitry, causing the computerized circuitry to perform a method of:

- (A) in response to a request signal that directs the storage system to store the user data, generating first parity and second parity based on the user data;
- (B) storing the first parity and the user data in a data uber of the storage system, the data uber providing redundant array of independent disks (RAID) protection; and
- (C) storing the second parity in designated free storage of the storage system, the designated free storage being separate from the data uber.

In some arrangements, the user data resides within K user data segments, K being a positive integer that is greater than or equal to 2. Additionally, generating the first parity and the second parity based on the user data includes calculating, as at least a portion of the first parity, a parity segment based on all of the K user data segments.

In some arrangements, the K user data segments includes a first group of user data segments and a second group of user data segments, the second group being different from the first group. Additionally, calculating the parity segment includes:
(i) calculating a first bitwise XOR segment based on the first group of user data segments,
(ii) calculating a second bitwise XOR segment based on the second group of user data segments, and
(iii) calculating the parity segment based on the first bitwise XOR segment and the second bitwise XOR segment.

In some arrangements, each of the first group of user data segments and the second group of user data segments includes exactly K/2 user data segments. For example, for RAID5(8+1), the first group includes four data segments and the second group includes another four data segments.

In some arrangements, the data uber is formed from storage on multiple storage devices of the storage system. Additionally, storing the first parity and the user data in the data uber of the storage system includes writing the parity segment and the K user data segments as at least a portion of a stripe within the data uber. Each segment of the parity segment and the K user data segments is written to storage on a different storage device of the multiple storage devices of the storage system.

In some arrangements, storing the second parity in the designated free storage of the storage system includes writing, as the second parity, the first bitwise XOR segment to a parity uber of the storage system, the parity uber being separate from the data uber.

In some arrangements, a stripe in the data uber includes (i) user data segments having the user data and (ii) a first parity segment having the first parity. Additionally, the method further includes, in response to a storage device failure in which a segment of the stripe is lost, performing a rebuild operation that constructs a replacement segment that replaces the segment of the stripe that is lost from less than all of the remaining segments of the stripe.

In some arrangements, the stripe includes exactly K user data segments, K being a positive integer. Additionally, a particular user data segment of the K user data segments of the stripe is lost. Furthermore, performing the rebuild operation includes:
(i) reading exactly K/2 user data segments of the stripe and the first parity segment of the stripe, and
(ii) constructing the replacement segment based on only the K/2 user data segments and the first parity segment.

In some arrangements, the stripe includes exactly K user data segments, K being a positive integer. Additionally, a particular user data segment of the K user data segments of the stripe is lost. Furthermore, performing the rebuild operation includes:
(i) reading exactly K/2 user data segments of the stripe, the first parity segment of the stripe, and a second parity segment having the second parity from the designated free storage, and
(ii) constructing the replacement segment based on only the K/2 user data segments, the first parity segment, and the second parity segment.

In some arrangements, the stripe includes exactly K user data segments, K being a positive integer. Additionally, the first parity segment of the stripe is lost. Furthermore, performing the rebuild operation includes:
(i) reading exactly K/2 user data segments of the stripe and a second parity segment having the second parity from the designated free storage, and
(ii) constructing the replacement segment based on only the K/2 user data segments and the second parity segment.

In some arrangements, the method further includes:
(i) creating a plurality of data ubers on storage devices of the storage system; and
(ii) creating a plurality of uber descriptors that describes the plurality of data ubers.

In some arrangements, each of the plurality of uber descriptors describes a respective data uber of the plurality of data ubers and includes:
(i) a type field constructed and arranged to indicate whether the respective data uber is regular uber that stores parity and user data, or a parity uber that exclusively stores parity;
(ii) a parity uber field constructed and arranged to store a pointer to a parity uber when the respective data uber is a regular uber; and
(iii) a set of backpointer fields constructed and arrange to store a set of backpointers to regular ubers when the respective data uber is a parity uber.

In some arrangements, the method further includes initializing each of the plurality of uber descriptors to indicated that each of the plurality of data ubers is initially a regular uber.

In some arrangements, the method further includes, after each of the plurality of uber descriptors is initialized and prior to generating the first parity and the second parity, updating contents of a type field of an uber descriptor to indicate that a particular data uber has been converted from a regular uber to a parity uber. The second parity then is stored in the particular data uber.

In some arrangements, the second parity is stored in a parity uber that is separate from the data uber. Additionally, the method further includes:
(i) detecting an event in which there are no free data ubers left within the storage system, and
(ii) in response to the event, invalidating the second parity stored in the parity uber and freeing the parity uber for use as another data uber.

In some arrangements, the storage system includes a log-based storage structure. Additionally, storing the first parity and the user data in the data uber of the storage system includes writing the first parity and the user data into the log-based storage structure as part of a background garbage collecting service.

In some arrangements, the storage system is constructed and arranged to perform data storage operations on behalf of a set of external host computers. Additionally, the user data includes host data from the set of external host computers. Furthermore, the method further includes providing the request signal that directs the storage system to store the user data in response to receiving the host data from the set of external host computers.

It should be understood that, in the cloud context, at least some electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in a flexible RAID scheme that allows fast storage system rebuild.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to a flexible redundant array of independent disks (RAID) data protection scheme that allows fast storage system rebuild. This flexible RAID data protection scheme involves generating first and second parity segments from the data segments in use. The first parity segment is generated from all of the data segments in use (e.g., from eight data segments if RAID5(8+1) is used) and stored in the RAID stripe. The second parity segment is generated from half of the data segments in use and stored in designated free storage which is available (or free) for use for other purposes within the storage system. If a segment of the RAID stripe is lost (e.g., due to a storage device failure), the lost segment may be rebuilt from half the number of data segments in use and the remaining parity. Since only half the number of data segments are read during rebuild, storage system performance is less degraded compared to a situation in which all of the data segments are read. Additionally, since it takes less time to read only half the number of data segments, rebuild duration is shorter so storage system reliability is improved. Furthermore, the second parity segment is simply provided for best efforts use, and the designated free storage that stores the second parity segment is available for other uses by the storage system thus providing improved storage efficiency.

Figure 1:
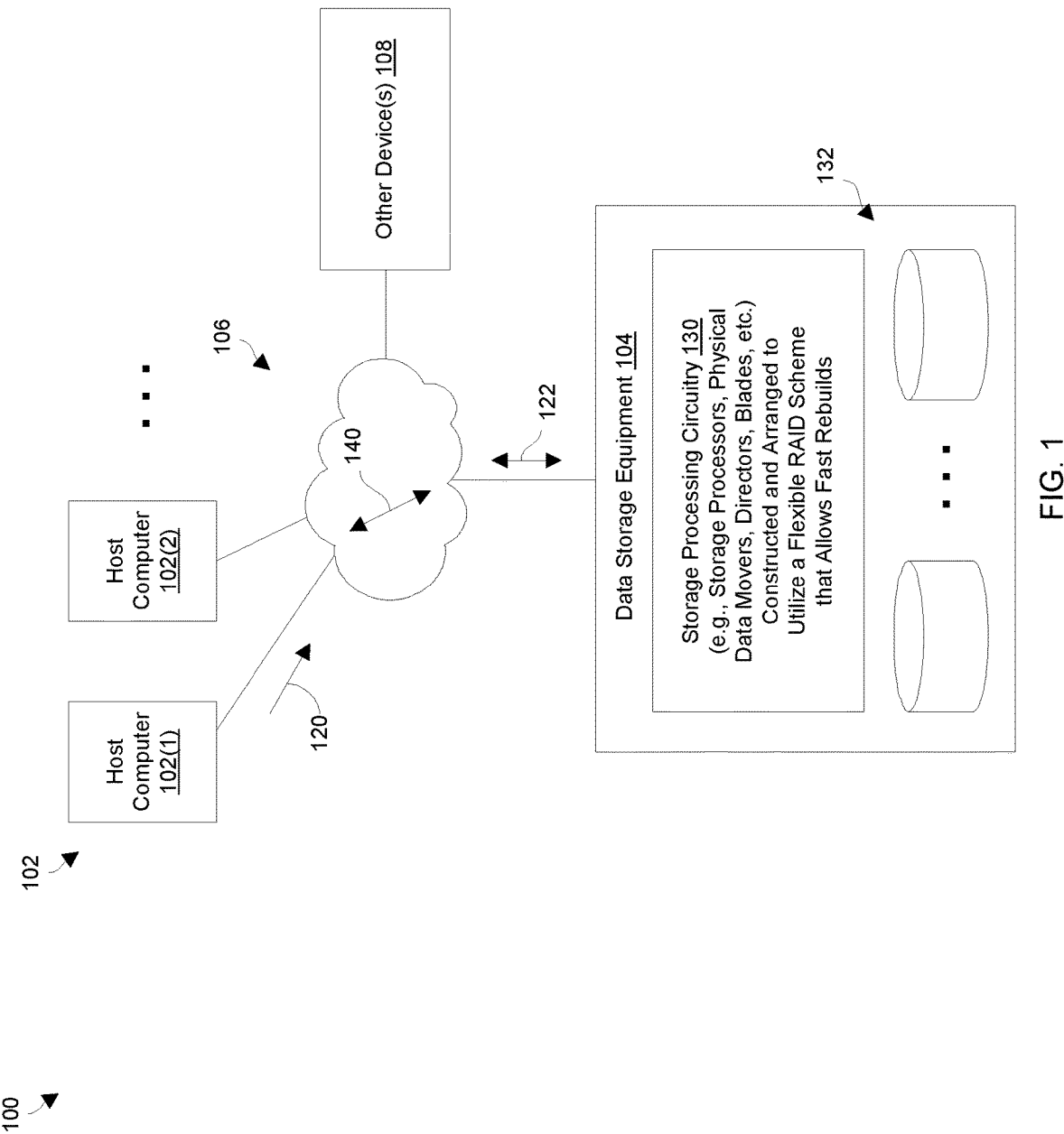
FIG. 1 is a block diagram of a storage system setting which utilizes a flexible RAID data protection scheme that allows fast storage system rebuild in accordance with certain embodiments.

FIG. 1 shows a storage system setting 100 which utilizes a flexible RAID data protection scheme that allows fast storage system rebuild in accordance with certain embodiments. The storage system setting 100 includes host computers 102(1), 102(2), . . . (collectively, host computers 102), data storage equipment 104, a communications medium 106, and perhaps other devices 108.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to richly and reliably store host data 122 within and retrieve host data 122 from storage (e.g., primary storage or main memory, secondary storage, tiered storage, combinations thereof, etc.).

The data storage equipment 104 includes storage processing circuitry 130 and storage devices 132. The storage processing circuitry 130 is constructed and arranged to respond to the host I/O requests 120 from the host computers 102 by writing data into the storage devices 132 and reading the data from the storage devices 132.

The storage processing circuitry 130 may include one or more physical storage processors (SPs) or engines, data movers, director boards, blades, I/O modules, storage device controllers, switches, other hardware, combinations thereof, and so on. The storage devices 132 provide persistent/non-volatile storage in accordance with one or more RAID data protection schemes and may include one or more types of storage drives, e.g., non-volatile random access memory (NVRAM) devices, solid state drives (SSDs), hard disk drives (HDDs), combinations thereof, and so on.

In accordance with certain embodiments, the storage processing circuitry 130 is constructed and arranged to store user data (e.g., the host data 122) in a log-structured storage provided by the storage devices 132. That is, the storage processing circuitry 130 performs log-structured writes in which the user data is written in full stripes (e.g., physical large blocks or PLBs) to new (or the next available) stripe locations within a log structure. During such operation, to update an original data block within an existing stripe location with a new data block, the storage processing circuitry 130 writes (perhaps with other user data) as a new full stripe that includes the new data block to a new empty (or available) stripe location in the log structure. The location that holds the original data block is not modified, but merely marked as invalid. Eventually, a garbage collection service (e.g., running as a background process) reclaims the storage holding invalidated data blocks thus providing further available locations within the log structure.

Additionally, in accordance with certain embodiments, at least some of the storage devices 132 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the storage system setting 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the storage system setting 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation, the storage processing circuitry 130 performs data storage operations to richly and robustly store user data in data structures referred to as ubers within the storage devices 132. Along these lines, the storage processing circuitry 130 manages the user data using a flexible RAID data protection scheme that allows for fast builds. Such a flexible RAID scheme is suitable for a variety of K+1 and K+2 RAID levels in which K is the number of storage devices in a stripe that stores user data. For example, in RAID5(8+1), K equals eight (8). Other RAID levels are suitable for use as well such as RAID5(4+1), RAID5(8+2), RAID5(12+1), RAID6, RAID10, and so on.

In particular, when the storage processing circuitry 130 is ready to write user data (e.g., data containing host data) to the storage devices 132, the storage processing circuitry 130 attempts to store additional parity for the user data in designated free storage (e.g., non-allocated or reserved space) if such free storage is available. This attempt to store the additional parity and/or subsequent use of the additional parity may be viewed as part of a best efforts strategy since certain conditions may disable this attempt (e.g., limited free storage space, heavy system loading when storing the user data, subsequent allocation of the space that held the additional parity, etc.).

For example, suppose that the storage processing circuitry 130 is to write nine segments (eight user data segments and one parity segment) to the storage devices 132 as a RAID5 (8+1) stripe. Here, the parity segment is based on all of the user data segments and can be used to rebuild any lost user data segment. If the attempt to store additional parity is made, the storage processing circuitry generates additional RAID5(4+1) parity using half of the user data segments and stores the additional RAID5(4+1) parity in the designated free storage. Such additional parity, if stored and available, enables fast rebuild to recover lost user data.

Additionally, the designated free storage that holds the additional parity may be relinquished thus improving storage efficiency. That is, the storage processing circuitry 130 counts the consumed space that holds the additional parity as free, and the consumed space may be allocated for storage at any time. Further details will now be provided with reference to FIG. 2.

Figure 2:
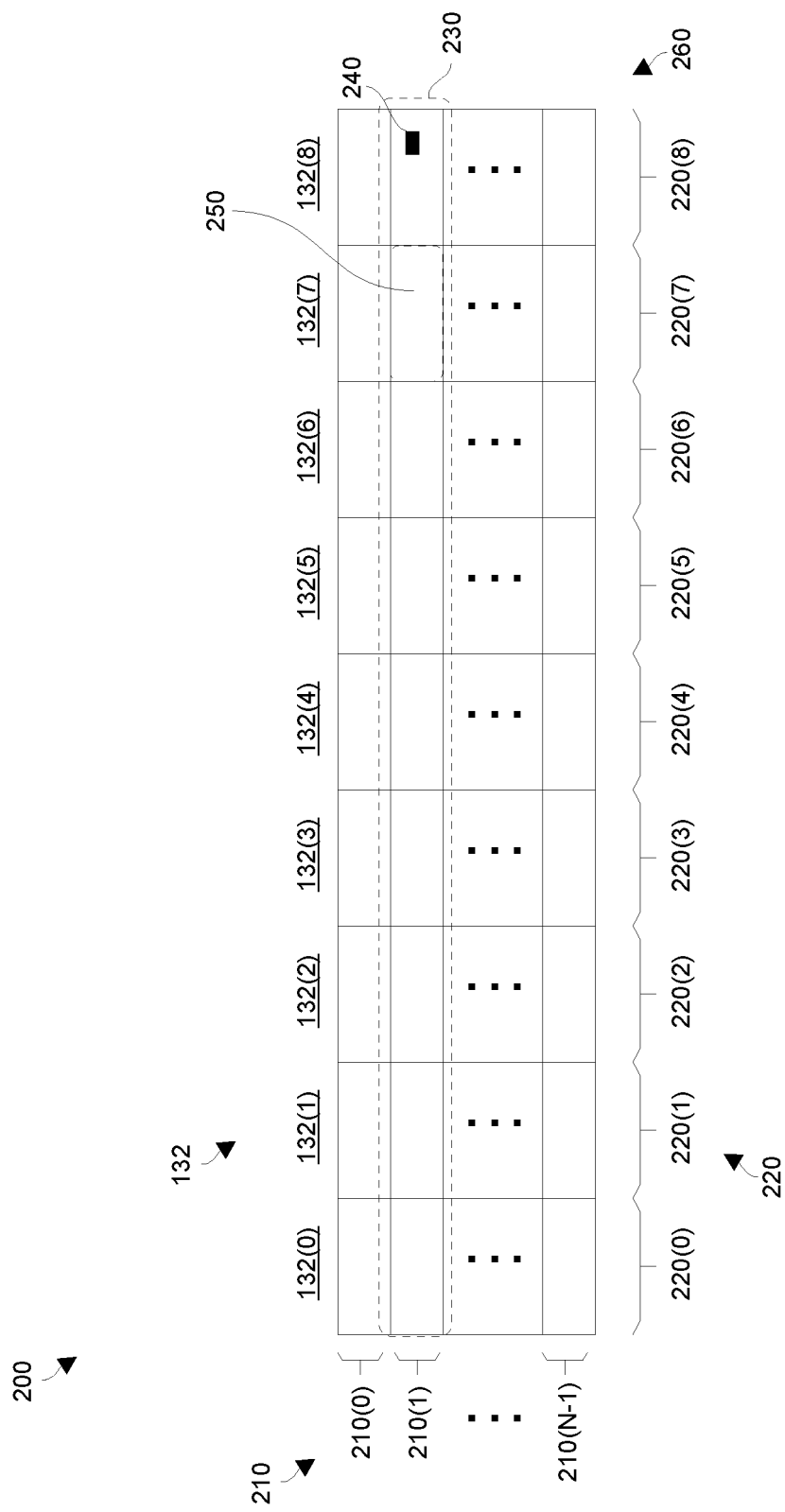
FIG. 2 is a block diagram illustrating details of the flexible RAID data protection scheme in accordance with certain embodiments.

FIG. 2 shows an uber 200 which is suitable for holding data and parity in accordance with certain embodiments. The uber 200 includes N rows 210(1), ..., 210(N) (collectively, rows 210) and K+1 columns 220(0), ..., 220(K+1) (collectively, columns 220).

By way of example only, the uber 200 is configured to use 8+1 (K=8) storage devices 132 using RAID level 5, i.e., RAID5(8+1). However, as mentioned earlier, it should be understood that other configurations and RAID levels are suitable for use, e.g., K+2 (RAID 6).

As shown in FIG. 2, each column 220 of the uber 200 resides on a separate storage device 132 (e.g., a different physical drive) of the data storage equipment 104 (also see FIG. 1). Moreover, at least one of the columns 220 is designated to hold parity (e.g., one column 220 for RAID 5, two columns 220 for RAID 6, etc.). In some arrangements, the parity segments may be staggered from row to row.

Data which is stored within a row 210 of the uber 200 is referred to as a physical large block (PLB) 230. In accordance with certain embodiments, each PLB 230 contains a fixed size of 2 MB of compressed data.

Within each PLB 230, there are fixed size data blocks 240. In accordance with certain embodiments, each data block 240 contains 4 KB of separately compressed user data and, thus, each PLB 230 may contain 512 (or more) data blocks 240.

In this example, the PLBs 230 are spread (or distributed) across eight storage devices 132. The portion of each PLB 230 stored on a particular storage device 132 is referred to as a segment 250. In accordance with certain embodiments, each segment 250 is 256 KB in size. Accordingly, for a PLB 230 that uses RAID5(8+1), there are eight data segments 250 each of which has 256 KB of user data and one parity segment 250 having 256 KB of parity. As a result, each PLB 230 consumes a total of 2 MB+256 KB (data+parity) of storage space.

Additionally, each uber 200 contains a fixed amount of user data and is constructed of fixed size slices 260. In accordance with certain embodiments, each uber 200 contains 64 GB of user data (excluding parity), and each slice 260 is 4 GB in size.

For the above example, an uber 200 with 8+1 (K=8) storage devices 132 has 8 GB on each storage device 132 (64 GB/8), and the uber 200 is constructed by two slices 260 of 4 GB each. That is, two slices 260 of 4 GB on eight storage device 132 provides 64 GB of user data (2×4 GB×8=64 GB), while the total capacity of the uber 200 is 72 GB (64 GB user data+8 GB parity).

During operation, the storage processing circuitry 130 (FIG. 1) performs log-structured writes to write entire PLBs 230 (i.e., full stripes) to available rows 210 of the uber 200. For example, when an original data block 240 within an existing PLB 230 is to be modified within the uber 200, the storage processing circuitry 130 writes a new PLB 230 containing the modified data block 240 to the next available row 210 (perhaps with other data in order to write a full stripe) and invalidates the original data block 240.

Additionally, the storage processing circuitry 130 performs a garbage collection (GC) process which merges partially utilized PLBs 230 from old rows 210 of the uber 200 and writes them to one or more new rows 210 within the uber 200, freeing the old rows 210. Such a garbage collection service may run in the background at a lower priority relative to I/O operations that the storage processing circuitry 130 performs in response to host I/O requests 120 (also see FIG. 1).

It should be understood that the PLB parity only needs to be calculated once, when a PLB 230 is written to the uber 200. Such calculation may occur during a "flush" phase in which natively written new user data is flushed from a cache to the uber 200. Additionally, such calculation may occur during a GC process in which a PLB 230 is written to a new row 210 with data consolidated from other PLBs 230. Further details will now be provided with referent to FIG. 3.

Figure 3:
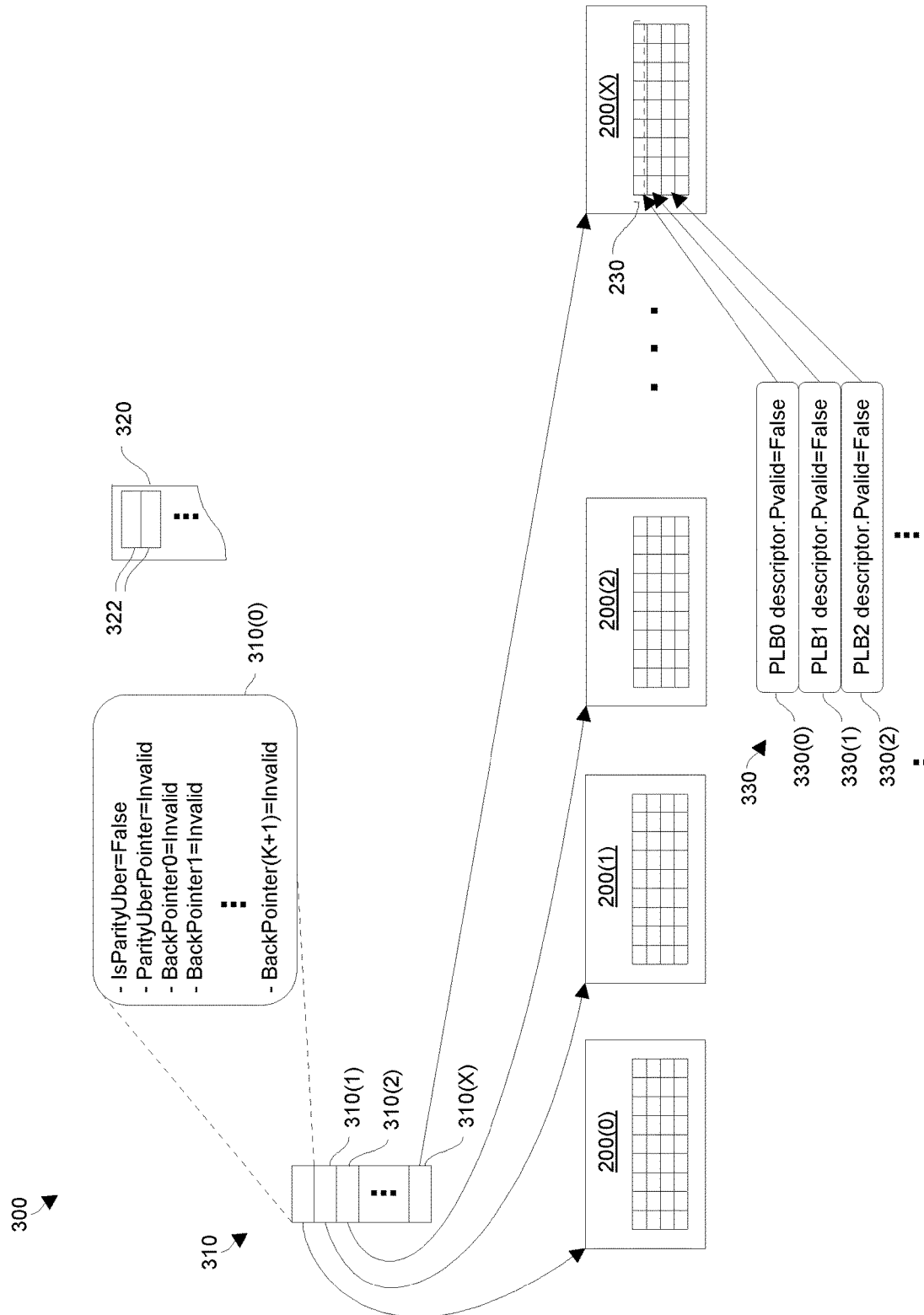
FIG. 3 is a block diagram illustrating additional details of the flexible RAID data protection scheme in accordance with certain embodiments.

FIG. 3 shows various constructs 300 which the data storage equipment 104 uses for the flexible RAID data protection scheme in accordance with certain embodiments. The various constructs 300 include a group of uber descriptors 310, a parity uber list 320, and ubers 200(0), ..., 200(X) (collectively, the ubers 200) which reside on the storage devices 132 (also see FIG. 2).

The uber descriptors 310(0), ..., 310(X) describe details of respective ubers 200(0), ..., 200(X). Along these lines, the uber descriptor 310(0) describes details of the uber 200(0). Similarly, the uber descriptor 310(1) describes details of the uber 200(1), the uber descriptor 310(2) describes details of the uber 200(2), and so on.

In some arrangements, the uber descriptors 310 reside in a separate location (e.g., in an area of storage that is separate from the ubers 200). In other arrangements, the uber descriptors 310 form parts of the ubers 200 themselves. Further details of the uber descriptors 310 will be provided shortly.

The parity uber list 320 is a list that identifies particular ubers 200, if any, that are currently serving as specialized ubers 200 to store only parity (not user data). Such specialized ubers 200 are referred to as parity ubers. In some arrangements, the parity uber list 320 resides in a separate location (e.g., in an area of storage that is separate from the ubers 200). Further details of the parity uber list 320 and parity ubers will be provided shortly.

As further shown in FIG. 3, the PLBs 230 which are stored within of each uber 200 include PLB headers 330 that identify particular details of respective PLBs 230 of that uber 200. For example, for the uber 200(X), a PLB header 330(0) identifies details of a first PLB 230 stored in a first PLB location of the uber 200(X), a PLB header 330(1) identifies details of a second PLB 230 stored in a second PLB location of the uber 200(X), a PLB header 330(2) identifies details of a third PLB 230 stored in a third PLB location of the uber 200(X), and so on.

As shown in FIG. 3, each PLB header 330 includes a PValid bit that indicates whether the respective PLB 230 has valid parity stored in a parity uber. Along these lines, False indicates that there is no valid parity stored in a parity uber for the respective PLB 230. However, True indicates that there is valid parity stored in a parity uber for the respective PLB 230.

In some arrangements, the PLB headers 330 reside in a separate location (e.g., in an area of storage that is separate from the PLBs 230 themselves). In other arrangements, the PLB headers 330 form parts of the PLBs 230 themselves.

With further reference to the group of uber descriptors 310, each uber descriptor 310 describes a respective uber 200. To this end, each uber descriptor 310 includes an IsParityUber flag constructed and arranged to indicate whether the respective uber 200 is a data uber or a parity uber, a ParityUberPointer field constructed and arranged to store a pointer that identifies a parity uber storage location that holds parity for PLBs 230 in the respective uber 200 when the respective uber 200 is a data uber and if such a parity uber exists, and BackPointer fields constructed and arranged to store a pointer that identifies a data uber for which the respective uber 200 holds parity if the respective uber 200 is a parity uber.

Figure 4:
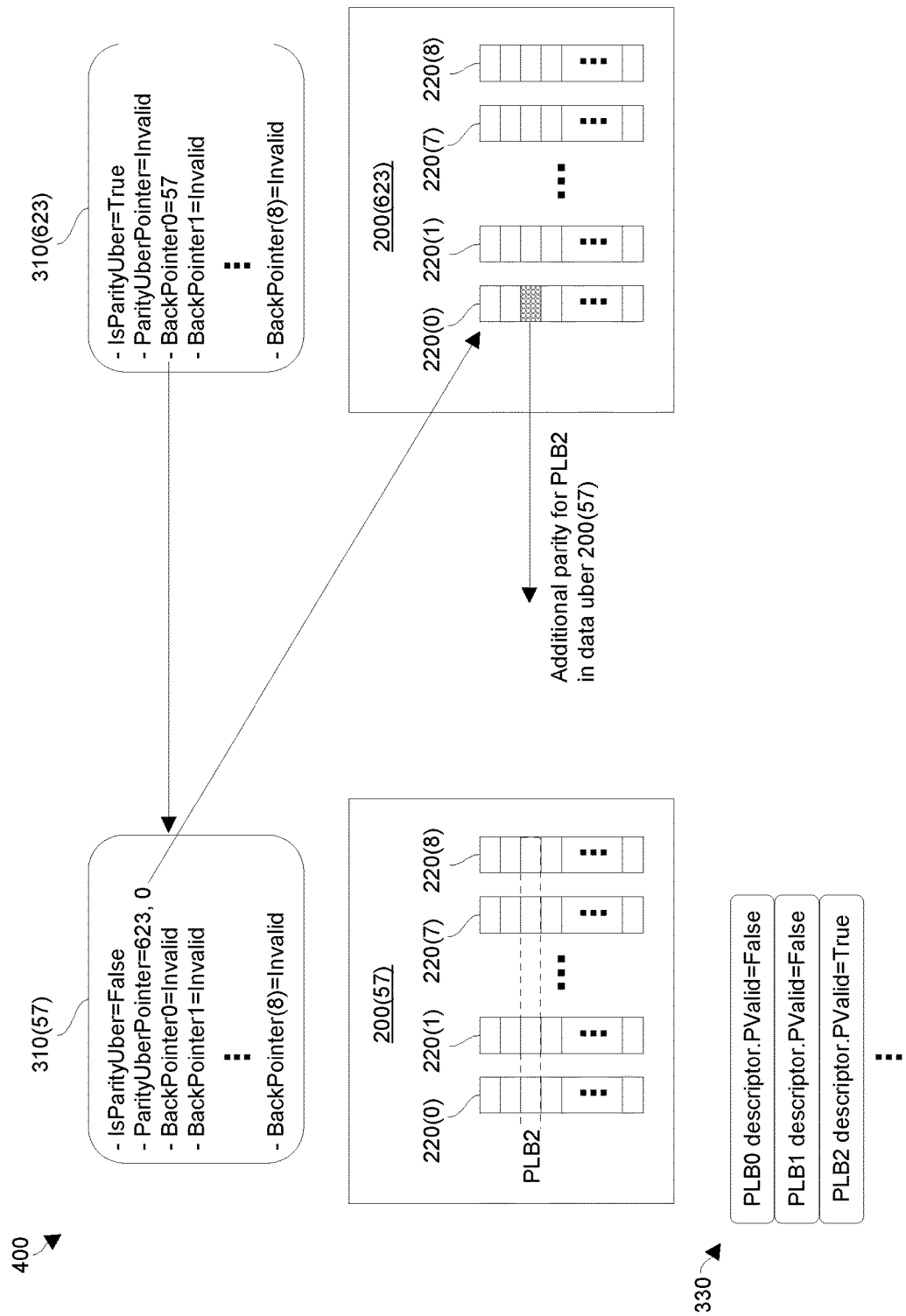
FIG. 4 is a block diagram illustrating further details of the flexible RAID data protection scheme in accordance with certain embodiments.

FIG. 4 shows an example 400 in which a flexible RAID data protection scheme is employed that allows for fast rebuilds. The example 400 includes a data uber 200(57) and a parity uber 200(623).

Initialization

During operation of the data storage equipment 104 (FIG. 1), the storage processing circuitry 130 initializes all of the uber descriptors 310 to indicate that the respective ubers 200 are data ubers. Along these lines, in each uber descriptor 310, the storage processing circuitry 130 clears the IsParityUber flag (e.g., sets the IsParityUber flag to False), clears the ParityUberPointer field (e.g., sets the ParityUberPointer field to invalid), and clears all of the BackPointer fields (e.g., sets the BackPointer fields to invalid), as shown in FIG. 3.

Additionally, all PLBs are initialized with the PValid bit cleared. That is, the PValid bits are set to False since initially there is no valid additional parity stored in any parity uber for any PLBs 230.

Furthermore, the storage processing circuitry 130 creates the parity uber list 320 which identifies ubers 200 that are currently operating as parity ubers. At the time of initialization, the parity uber list 320 is empty. However, during the course of operation, the storage processing circuitry 130 assigns ubers 200 to operate as parity ubers and adds entries 322 to the parity uber list 320 to identify the parity ubers.

After initialization, the data storage equipment 104 is able to perform data storage operations on behalf of external host computers 102 (also see FIG. 1). Along these lines, the storage processing circuitry 130 may write user data (which may include host data from the host computers 102) to the ubers 200. Further details of this writing process is provided shortly with reference to FIG. 4.

Data Uber Allocation

When the data storage equipment 104 allocates a data uber to store user data, the data storage equipment 104 also allocates corresponding space for additional parity. Along these lines, if there is an already allocated parity uber with available space, the storage processing circuitry 130 uses that available space. Otherwise, the data storage equipment 104 allocates a new parity uber.

To allocate a new parity uber, the storage processing circuitry 130 adds an entry 322 to the parity uber list 320 to identify the new parity uber. Additionally, the storage processing circuitry 130 updates details within the group of uber descriptors 310 to track allocation of the new parity uber and the corresponding space within the new parity uber for the additional parity.

By way of example and as shown in FIG. 4, suppose that the storage processing circuitry 130 has allocated the uber 200(57) as a data uber and is ready to store a new PLB 230 in a PLB location PLB2 within the uber 200(57). Further suppose that the storage processing circuitry has allocated the uber 200(623) as a new parity uber and a corresponding space within the uber 200(623) to hold the additional parity (see the shaded box within the uber 200(623) in FIG. 4).

To update details within the group of uber descriptors 310 to track allocation of the new parity uber and the corresponding space within the new parity uber for the additional parity, the storage processing circuitry 130 updates the uber descriptor 310(57) that describes the uber 200(57) and the uber descriptor 310(623) that describes the uber 200(623). In particular, the storage processing circuitry 130 sets the IsParityUber flag of the uber descriptor 310(623) to True to indicate that the uber 200(623) is now a parity uber. Additionally, the storage processing circuitry 130 sets the BackPointer0 field of the uber descriptor 310(623) to indicate that the first column 220(0) of the uber 200(623) is configured to hold additional parity for the uber 200(57). Furthermore, the storage processing circuitry 130 sets the ParityUberPointer of the data uber 200(57) to point to the first column 220(0) of the uber 200(623) to identify the location of the additional parity for the uber 200(57) (e.g., "623" identifies the uber 200(623) and "0" is an offset that identifies the column within the uber 200(623)).

Once the uber descriptors 310(57) and 310(623) have been updated as described above, the data storage equipment 104 is ready to store a new PLB 230 in the PLB location PLB2 within the uber 200(57) using a flexible RAID scheme in accordance with certain embodiments. It should be understood that similar operations are performed in order to store other PLBs 230 in other PLB locations among the ubers 200 using the flexible RAID scheme.

Flush

At certain times, the data storage equipment 104 may be ready to flush user data to the storage devices 132. For example, a write cache of the data storage equipment 104 may have accumulated a certain amount (e.g., a predefined amount) of host data, a timer may have expired, etc. Such events are considered to provide a request signal that directs the storage processing circuitry 130 to store the user data.

When the data storage equipment 104 is ready to perform an actual write of a PLB 230 to a PLB location within a data uber (e.g., see the PLB2 location of the uber 200(57) in FIG. 4), the data storage equipment 104 generates parity for the PLB 230. If there is no corresponding space within a parity uber allocated for additional parity, the data storage equipment 104 simply calculates the full parity segment P(PLB) of the PLB 230 and does not calculate additional parity for the PLB 230.

However, suppose that there is corresponding space within a parity uber allocated for additional parity for the PLB 230 (e.g., see FIG. 4), the data storage equipment 104 generates the full parity segment P(PLB) for use in the PLB 230 and additional parity for storing in the parity uber. In particular, the storage processing circuitry 130 generates first-half parity segment P(H1) for a first half of the storage devices 132 that will store the PLB 230 and second-half parity segment P(H2) for a second half of the storage devices 132 that will store the PLB 230. If the PLB 230 uses RAID5(8+1), the first-half parity segment P(H1) is calculated as an XOR of four data segments of the eight data segments, and the second-half parity segment P(H2) is calculated as an XOR of the remaining four data segments of the eight data segments.

The storage processing circuitry 130 then generates the full parity segment P(PLB) based on the first-half parity segment P(H1) and the second-half parity segment P(H2) for the PLB 230. In accordance with certain embodiments, the storage processing circuitry 130 calculates the full parity segment P(PLB) by XORing the first-half parity segment P(H1) and the second-half parity segment P(H2), i.e., P(PLB)=P(H1)+P(H2) where '+' indicates an XOR operation.

Next, the storage processing circuitry 130 writes the parity segment P(PLB) as part of the write of the PLB 230 to the PLB location within the data uber. That is, for RAID5(8+1), the storage processing circuitry 130 writes the eight data segments and the full parity segment P(PLB) to the PLB location (e.g., see the PLB2 location of the uber 200(57) in FIG. 4).

Additionally, the storage processing circuitry 130 writes the first-half parity segment P(H1) to the corresponding space within the parity uber allocated for additional parity for the PLB 230 (e.g., see the shaded box in the column 220(0) of the uber 200(623) in FIG. 4). Furthermore, the storage processing circuitry 130 sets the PValid bit for the PLB 230 in the PLB header 330 (e.g., see the PLB header PLB2 in FIG. 4) to indicate that additional parity for the PLB 230 exists.

At this point, the PLB 230 is stored in accordance with the flexible RAID scheme. Accordingly, if there is a loss of a segment of the PLB 230, the lost segment may be rebuilt from only half of the remaining data segments and from the remaining parity. Thus, there is less impact on the data storage equipment 104 compared to a rebuild that requires all remaining segments, rebuild time is shortened, and reliability is improved.

It should be appreciated that the flexible RAID scheme described in the example 400 utilizes stripes across K+1 storage devices (K being at least 2). Accordingly, the system benefits both from efficient space utilization of using K+1 storage devices and efficient data recovery time and rebuild duration of a K/2+1 scheme which improves the system integrity and reliability.

It should be further understood that there may situations in which it is advantageous to disable generating the additional parity. For example, if the data storage equipment 104 is highly loaded, the operations that create the additional parity may be skipped to avoid degrading performance.

Garbage Collection (GC)

The data storage equipment 104 is able to generate and write additional parity when writing a new PLB 230 resulting from a garbage collection (GC) process. In accordance with certain embodiments, a background GC service consolidates user data from old PLBs 230 into one or more new PLBs in order to free the PLB locations that stored the old PLBs 230.

During such processing, the storage processing circuitry 130 creates the additional parity in a manner similar to that described above for flushing. However, in addition to the above-described operations, the storage processing circuitry 130 clears the PValid bits within the PLB headers 330 of the freed PLBs 230.

Rebuild

Situations exist in which the data storage equipment 104 rebuilds data to recover a PLB 230 stored in a data uber. For example, a storage device 132 of the data storage equipment 104 may fail, the data storage equipment 104 may encounter a storage device hiccup, and so on.

In such rebuild situations, the data storage equipment 104 may not have to perform a full recovery by reading all of the remaining PLB segments. Rather, the data storage equipment 104 first checks to see if the lost data can be recovered via a faster route using the additional parity.

Along these lines, the storage processing circuitry 130 inspects the ParityUberPointer field of the uber descriptor 310 for the data uber. If the ParityUberPointer field is set to Invalid, there is no additional parity and the storage processing circuitry 130 falls back to a normal recovery process.

However, if the ParityUberPointer field has a valid pointer to a parity uber (e.g., see the uber descriptor 310(57) in FIG. 4), the storage processing circuitry 130 then checks the PValid bit for the PLB 230. If the PValid bit of the PLB header 330 for the PLB 230 is cleared, there is no additional parity for the PLB 230. On the other hand, if the PValid bit of the PLB header 330 for the PLB 230 is set (e.g., see the PLB descriptor 330 for PLB2 in FIG. 4), additional parity for the PLB 230 exists and the lost segment may be recovered by reading from only half of the storage devices 132.

For example, as shown in FIG. 4, the ParityUberPointer field of the uber descriptor 310(57) for the data uber 200(57) includes a pointer to a location in the column 220(0) in the parity uber 200(623), and the PValid bit of the PLB header 330 for the PLB2 is set to True. Accordingly, there is additional parity in the parity uber 200(623), and the lost data may be rebuilt by reading the parity and only half of the data.

If the failed storage device 132 is part of the first half (or group) of the storage devices 132 that stores the data segments used to generate the first-half parity segment P(H1), then the storage processing circuitry 132 simply uses the remaining data segments of the first half of the storage devices 132 and the first-half parity segment P(H1) to rebuild the lost data segment. That is, the storage processing circuitry 132 reads the three remaining data segments from the first half of the storage devices 132 and the first-half parity segment P(H1) and rebuilds the lost data via an XOR operation. For example, if the PLB 230 used RAID5(8+1), the storage processing circuitry 132 performs a RAID5(4+1) rebuild using only half of the data.

If the failed storage device 132 is part of the second half (or group) of the storage devices 132 that stores the data segments used to generate the second-half parity segment P(H2), then the storage processing circuitry 132 still uses the additional parity. In particular, the storage processing circuitry 132 XORs the full parity segment P(PLB) with the first-half parity segment P(H1) to compute the second-half parity segment P(H2).

Next, the storage processing circuitry 132 uses the remaining data segments of the second half of the storage devices 132 and the second-half parity segment P(H2) to rebuild the lost data segment. That is, the storage processing circuitry 132 reads the three remaining data segments from the second half of the storage devices 132 and then uses the second-half parity segment P(H2) to rebuild the lost data via an XOR operation. Again, if the PLB 230 used RAID5(8+1), the storage processing circuitry 132 performs a RAID5(4+1) rebuild using only half of the data.

If the failed storage device 132 stores the full parity segment P(PLB), then the storage processing circuitry 132 still uses the additional parity. In particular, the storage processing circuitry 132 reads the four data segments from the second half of the storage devices 132 and generates the second-half parity segment P(H2) from the four data segments. Next, the storage processing circuitry 132 XORs the additional parity, which is the first-half parity segment P(H1), with the second-half parity segment P(H2) to generate the full parity segment P(PLB).

As explained above, when the additional parity is available, the storage processing circuitry 132 needs to read from only half of the storage devices 132 in order to rebuild the lost data. Accordingly, there is less impact on the data storage equipment 104 compared to a rebuild that requires all remaining segments, rebuild time is shortened, and reliability is improved.

Freeing a Parity Uber

There may be situations in which a new data uber needs to be allocated but there are no free ubers 200 left, or the number of free ubers 200 has shrunk to a predefined threshold. In such a situation, the data storage equipment 104 deallocates a parity uber so that the uber can be used as a new data uber.

Along these lines, the storage processing circuitry 132 accesses the parity uber list 320 to identify a parity uber for deallocation. The storage processing circuitry 132 then removes the entry that identifies the parity uber that is to be deallocated. In some arrangements, the storage processing circuitry 132 goes to the tail of the parity uber list 320 and removes the last entry.

Next, the storage processing circuitry 132 goes to the BackPointer fields of the uber descriptor 310 for the parity uber and, for each pointer in the BackPointer fields, the storage processing circuitry 132 sets the contents of the ParityUberPointer fields of the identified data ubers to invalid, and clears all of the PValid bits of the PLBs 230 of the identified data ubers. For example and with attention on FIG. 4, the storage processing circuitry 132 goes to the BackPointer fields of the uber descriptor 310(623) for the parity uber 200(623) and, based on the pointer in the BackPointer0 field, the storage processing circuitry 132 sets the contents of the ParityUberPointer field of the data uber 200(57) to invalid, and clears the PValid bit of PLB2 of the data uber 220(57).

Additionally, the storage processing circuitry 132 sets the BackPointer field of the parity uber to Invalid, and clears the IsParityUber flag of the parity uber (e.g., see the uber descriptor 310(623) in FIG. 4). The uber 200(623) is then returned to the pool of free ubers to be allocated as a new data uber.

Further Details

Figure 5:
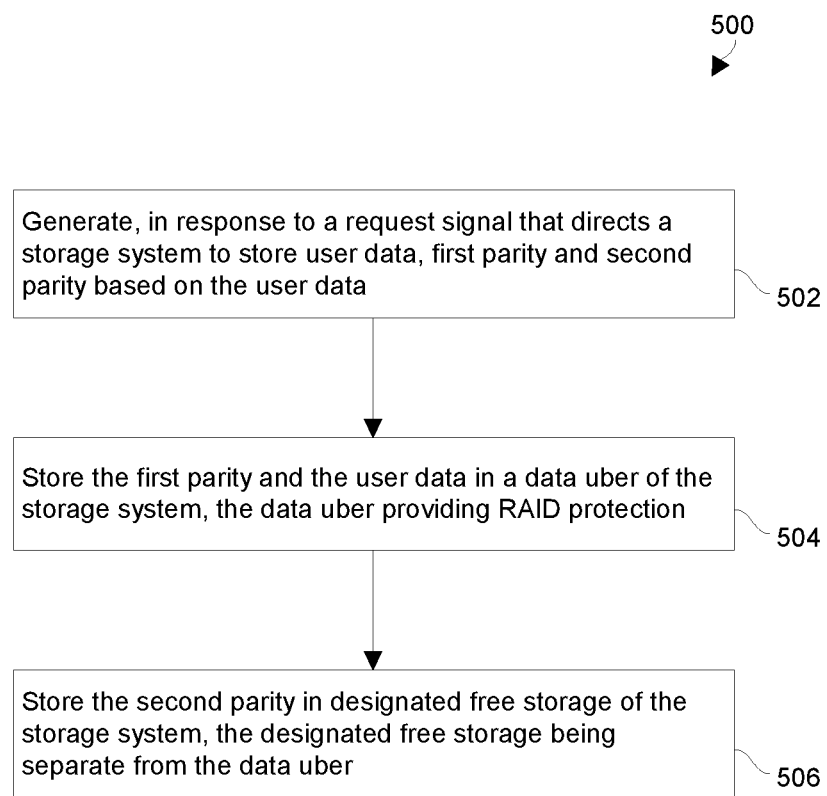
FIG. 5 is a flowchart of a procedure which is performed by specialized equipment in accordance with certain embodiments.

FIG. 5 is a flowchart of a procedure 500 which is performed by specialized equipment within a storage system setting in accordance with certain embodiments (also see FIG. 1). The procedure 500 utilizes a flexible RAID scheme that allows fast storage system rebuild.

At 502, the specialized equipment generates, in response to a request signal that directs the storage system to store the user data, first parity and second parity based on the user data. For example, for RAID5(K+1) stripe where K is at least 2, the first parity may be a full parity segment derived based on all K data segments of the stripe, and the second parity may be a half parity segment derived from K/2 of the data segments of the stripe. In some arrangements, the specialized equipment creates two half parity segments (one half parity segment based on K/2 data segments, and another half parity segment based on the other K/2 data segments) and the computes the full parity segment based on the two half parity segments.

At 504, the specialized equipment stores the first parity and the user data in a data uber of the storage system, the data uber providing redundant array of independent disks (RAID) protection. For example, the specialized equipment stores a stripe that includes all K data segments and the full parity segment in the data uber.

At 506, the specialized equipment stores the second parity in designated free storage of the storage system, the designated free storage being separate from the data uber. For example, the specialized equipment stores the half parity segment in a parity uber that is separate and distinct from the data uber.

It should be understood that the specialized equipment may initialize the ubers and/or associated constructs prior to or as part of performing the procedure 500. Such initialization may involve adjusting descriptors, headers, flags, pointer fields, etc. (also see FIGS. 3 and 4).

It should also be understood that the specialized equipment may rebuild data after or as part of performing the procedure 500. Such rebuilding is faster than a conventional rebuild since less than all of the remaining data needs to be read when reconstructing the lost data.

Additionally, it should be understood that the procedure 500, or portions of the procedure 500, may be disabled and/or re-enabled based on current operating conditions within the storage system. For example, the procedure 500 may be disabled if the storage system is heavily loaded or low on storage space. However, the procedure 500 may be re-enabled later on, e.g., if the storage system is no longer heavily loaded, if there is more available storage, etc.

Figure 6:
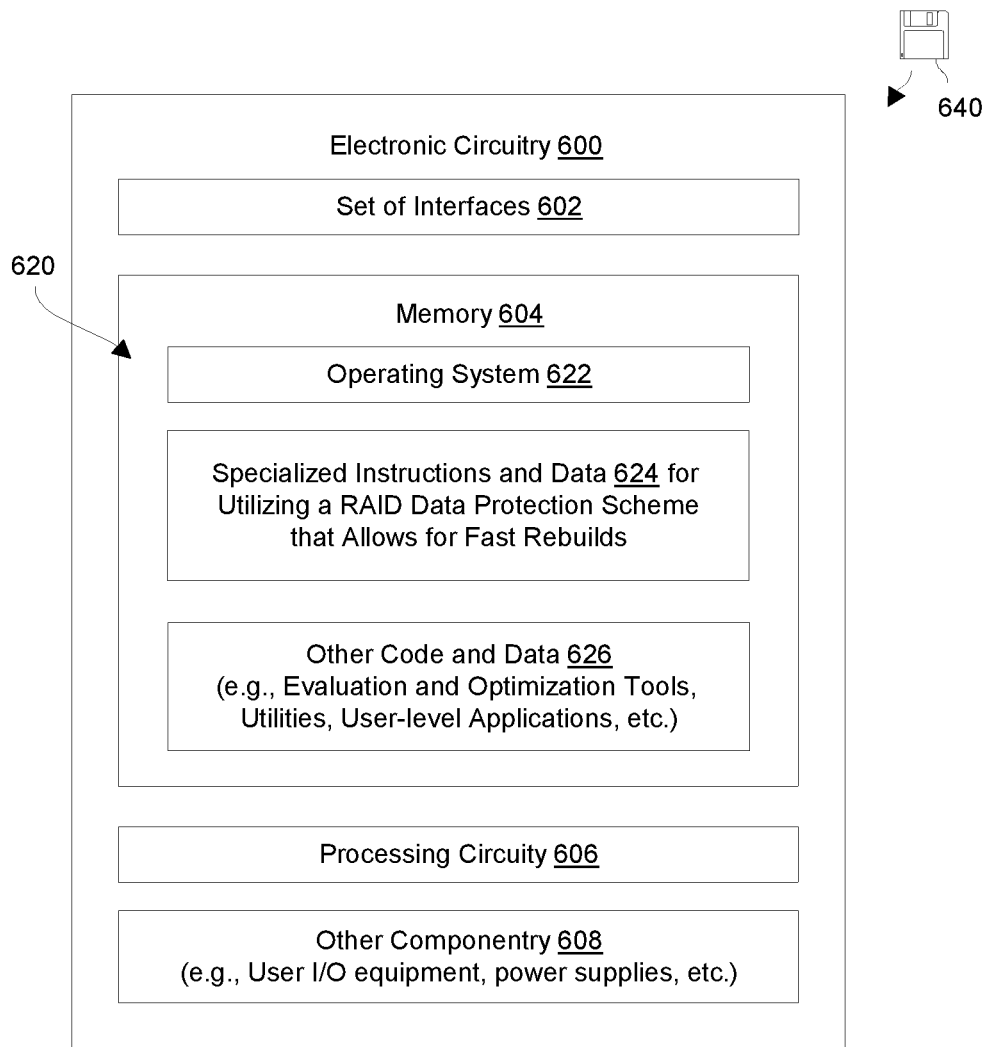
FIG. 6 is a block diagram illustrating electronic equipment in accordance with certain embodiments.

FIG. 6. shows electronic circuitry 600 which is suitable for at least a portion of the data storage equipment 104 (also see FIG. 1). The electronic circuitry 600 includes a set of interfaces 602, memory 604, and processing circuitry 606, and other circuitry 608.

The set of interfaces 602 is constructed and arranged to connect the data storage equipment 104 to the communications medium 106 (also see FIG. 1) to enable communications with other devices of the storage system setting 100 (e.g., the host computers 102). Such communications may be IP-based, SAN-based, cellular-based, cable-based, fiber-optic based, wireless, cloud-based, combinations thereof, and so on. Accordingly, the set of interfaces 602 may include one or more host interfaces (e.g., a computer network interface, a fibre-channel interface, etc.), one or more storage device interfaces (e.g., a host adapter or HBA, etc.), and other interfaces. As a result, the set of interfaces 602 enables the electronic circuitry 600 to robustly and reliably communicate with other external apparatus.

The memory 604 is intended to represent both volatile storage (e.g., DRAM, SRAM, etc.) and non-volatile storage (e.g., flash memory, magnetic memory, etc.). The memory 604 stores a variety of software constructs 620 including an operating system 622, specialized instructions and data 624, and other code and data 626. The operating system 622 refers to particular control code such as a kernel to manage computerized resources (e.g., processor cycles, memory space, etc.), drivers (e.g., an I/O stack), and so on. The specialized instructions and data 624 refers to particular instructions for utilizing the flexible RAID data protection scheme that allows for fast rebuilds. In some arrangements, the specialized instructions and data 624 is tightly integrated with or part of the operating system 622 itself. The other code and data 626 refers to applications and routines to provide additional operations and services (e.g., performance measurement tools, etc.), user-level applications, administrative tools, utilities, and so on.

The processing circuitry 606 is constructed and arranged to operate in accordance with the various software constructs 620 stored in the memory 604. As will be explained in further detail shortly, the processing circuitry 106 executes the operating system 622 and the specialized code 624 to form specialized circuitry that robustly and reliably manages host data on behalf of a set of hosts. Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 640 is capable of delivering all or portions of the software constructs 620 to the electronic circuitry 600. In particular, the computer program product 640 has a non-transitory (or non-volatile) computer readable medium which stores a set of instructions that controls one or more operations of the electronic circuitry 600. Examples of suitable computer readable storage media include tangible articles of manufacture and apparatus which store instructions in a non-volatile manner such as DVD, CD-ROM, flash memory, disk memory, tape memory, and the like.

The other componentry 608 refers to other hardware of the electronic circuitry 600. Along these lines, the electronic circuitry 600 may include special user I/O equipment (e.g., a service processor), busses, cabling, adaptors, auxiliary apparatuses, other specialized data storage componentry, etc.

As described above, improved techniques are directed to a flexible RAID scheme that allows fast storage system rebuild within a storage system setting 100. The flexible RAID scheme involves generating multiple parity segments from the data segments in use. A first parity segment is generated from all of the data segments in use (e.g., from eight data segments if RAID5(8+1) is used) and stored in the RAID stripe. A second parity segment is generated from half of the data segments in use and stored in designated free storage which is available (or free) for use for other purposes within the storage system setting 100. If a segment of the RAID stripe is lost (e.g., due to a storage device failure), the lost segment may be rebuilt from half the number of data segments in use and the remaining parity. Since only half the number of data segments need to be read during rebuild, storage system performance is less degraded compared to a situation in which all of the data segments are read. Additionally, since it takes less time to read only half the number of data segments, rebuild duration is shorter so storage system reliability is improved. Furthermore, the second parity segment is simply provided for best efforts use, and the designated free storage that stores the second parity segment is available for other uses by the storage system thus providing improved storage efficiency.

One should appreciate that the above-described techniques do not merely collect and store data. Rather, the disclosed techniques involve protecting data against data loss due to an event such as a storage device failure, hiccup, etc. With the flexible RAID techniques disclosed herein, other advantages are available as well such as fast rebuilds, minimizing system degradation, improving system reliability, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the storage system setting 100 such as the host computers 102, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, some of the examples provided above described the storage system setting as using RAID5(8+1) stripes. However, other RAID levels/formats/etc. are suitable for use. Along these lines, the techniques disclosed herein may be used with any K+1 and any K+2 RAID scheme in which K is greater than or equal to 2.

Furthermore, in accordance with certain embodiments, the data storage equipment 104 (FIG. 1) needs to guarantee that it has enough free space to write recovered data in response to a storage device failure. Here, the data storage equipment 104 reserves a "rebuild reservation" space that is kept free and is used only when the data storage equipment 104 performs rebuild. Such space may be formed by portions of the storage devices 132, hot standby storage devices 132, combinations thereof, etc.

In some arrangements, the data storage equipment 104 uses the "rebuild reservation" space for the additional parity. In such arrangements, the data storage equipment 104 is constructed and arranged to update pointers in the uber descriptors 310, etc. to enable proper uber and space identification, etc.

It should be appreciated that, when a drive fails in a conventional data storage system, a rebuild process starts in which the data located on the failed drive is recovered by calculating the bitwise XOR of all of the other drives, then written to a healthy drive. The rebuild duration is a significant parameter of the system that affects its reliability. The longer the rebuild, the longer the performance degradation and also the greater probability that a second drive will fail which may cause to unavailability of the storage system.

Consider a system A that uses an 8+1 RAID scheme, comparing to a system B that uses 4+1 RAID scheme:

When a drive fails, system A will have to calculate XORs of 8 blocks to recover a data block, while system B requires only 4 data blocks XOR. This means that system A has to read double amount of data to maintain the same rebuild speed as system B, which is not always possible due to hardware and/or other resource limitations. Therefore, the rebuild duration will be faster in system B, and as such system A is less reliable because the probability of a second drive failure is higher. Also, system A will experience a longer performance degradation, because the rebuild process utilizes high system resources i.e., reading/writing to drives, XOR calculations, etc.

On the other hand, system A uses less storage space for parity, as it requires one parity block for every eight data blocks, while system B requires one parity block for every four data blocks.

As described, choosing a RAID scheme for the conventional storage system involves a trade-off between space utilization vs reliability (rebuild time) and level of performance degradation during rebuild.

However, in accordance with certain embodiments disclosed herein, a flexible RAID scheme provides efficient space utilization (e.g., 8+1), but also enables faster rebuild time and improved system reliability of less space-efficient (4+1) scheme in the majority of cases, by storing additional parity on free/reserved space. Such embodiments are not limited to 8+1 RAID schemes, but to every K+1 and K+2 RAID scheme as well as others.

Accordingly, choosing a RAID scheme for a conventional storage system involves a trade-off between space efficiency vs reliability (defined by duration of rebuild)+performance degradation in case of rebuild. On the other hand, in accordance with certain improved techniques disclosed herein, there is a flexible RAID scheme that provides an efficient space utilization (e.g., 8+1), but also capable of a faster rebuild time and improved system reliability of less space-efficient (4+1) scheme in the majority of cases, by storing additional parity on free/reserved space. Of course, the proposed solution is not limited to 8+1 RAID schemes, but to every K+1 and K+2 RAID schemes.

Consider a storage system composed of storage nodes which generally includes a CPU, memory and a DAE (Disk Array Enclosure) as the backend.

The storage system uses a RAID 5 or RAID 6 parity protection scheme to store the user data. The RAID is organized in grids of fixed size blocks, with N rows and K+1 (RAID 5) or K+2 (RAID 6) columns called ubers. Each column is a separate physical drive, and one (RAID 5) or two (RAID 6) columns are designated as parity. For RAID 6 for example, each UBER contains a subset of K+2 drives.

The Data in each row in the uber is called a PLB (Physical Large Block) which contains fixed 2 MB of compressed data. Each fixed size 4 KB block of user data is compressed separately, thus a PLB may contain more than 512 data blocks.

For example, there may be an UBER with 8+1 (K=8) drives (RAID 5). In this example, a 2 MB PLB is split between eight drives 0 . . . 7, each stores 256 KB, and the parity drive stores 256 KB of parity, which means each line stores a total of (2 MB+256 KB) (data+parity).

Each UBER contains fixed capacity (e.g., 64 GB) of user data (excluding parity), and is constructed by fixed size "slices" of 4 GB.

For the above example, an uber with 8+1 (K=8) drives will have 8 GB on each drive (64 GB/8), which are constructed by 2 slices of 4 GB each (2 slices of 4 GB×8 data drives=2×4×8=64 GB of user data), while the total capacity of the uber is 72 GB (64 GB data+8 GB parity).

In accordance with certain embodiments, the storage system uses log-structured writes for the user data—it always writes full stripes (PLBs). When a data block within an existing PLB is overwritten, the new (compressed) data will be written (together with more new data) to a new (empty) PLB (the existing PLB which held the old data is never modified—the updated block is only marked as invalidated).

The system uses a garbage collection (GC) process which merges partially utilized PLBs and writes them to a new PLB, freeing the old PLBs.

This means that the PLB parity is calculated only once, when the PLB is written: either during a "flush" phase in which the PLB is natively written with new data, or during a GC process in which the PLB is written with data from other PLBs.

In accordance with certain embodiments, improved techniques utilize reserved/non-allocated space for additional RAID parity blocks, virtually converting 8+1 Uber/PLB to 2×"4+1" as a best effort. Furthermore, the additional parity is calculated for half of the drives and used for fast recovery at the time of rebuild (if still valid), thus reducing rebuild duration. Also, space used for additional parity is counted as a free (from client's perspective) and may be allocated at any time.

In accordance with certain embodiments, non-allocated space is used for additional parity. Separate ubers are allocated (as a best effort) to keep additional parity blocks for PLBs located in regular (data) ubers.

In accordance with certain embodiments, there are new data structures:

1) In the UBER descriptor:
   a. IsParityUber: this flag will indicate if this UBER is allocated for additional parity.
      i. If this flag is set, it means this UBER is used as Parity-UBER.
      ii. If this flag is cleared, it means this UBER is a normal Data-UBER (i.e., stores user data).
   b. Data-UBERs back pointers: this is relevant only for Parity-Ubers. These pointers point to the corresponding Data-UBERs for which this Parity-UBER keeps the additional parities for. Note that assuming 8+1 scheme, each Parity Uber maintains additional parity for 9 Data-Ubers and have 9 back pointers correspondingly.
   c. Parity-UBER Pointer: this is relevant only for Data-Ubers. This pointer will indicate the Parity-UBER and the location inside it which stores the additional parity.
2) (Optionally) In the PLB descriptor or PLB header (maintained per PLB):

a. PValid bit: this bit will indicate if this PLB has a valid additional parity.

Note: maintaining of this bit is optional optimization, allowing to avoid additional parity handling during Flush in case of high load 3) Parity-UBERs list: This list will keep the UBERs that were allocated for additional parity. This list is used to reclaim allocated Parity-UBERs.

In accordance with certain embodiments, there are the following flows:

1) Initialization: all UBERs are initialized as Data-UBERs, with IsParityUber flag cleared, invalid Data-UBERs pointers and invalid Parity-UBER pointer. Also, all PLBs are initialized with PValid bit cleared.
2) Data-UBER allocation: When a Data-UBER is allocated, a corresponding space for additional parity will be allocated as well. If there's available space in the already allocated Parity-UBER, it is used. Otherwise, allocate a new Parity-UBER and add it to the Parity-UBERs list. (Assuming that each Parity-Uber hold the additional parity of 9 Data-Ubers, each specific Data-Uber use the ⅑ of the Parity-Uber, and the partitions order is the same as the back-pointers order).
   a. For newly allocated Parity-UBER, set its IsParityUber flag.
   b. Set the corresponding back-pointer to the Data-UBER.
   c. Set the Parity-UBER Pointer of the Data-Uber to point to the allocated space in the Parity-UBER. (i.e., if the order of this back-pointer in the Parity-Uber is 4, this means that the offset of the corresponding partition inside the Parity-Uber is 4*(1/9)*Uber_size).
3) Flush:
   a. Consider a PLB "PLB1" parity is to be calculated.
   b. If the Parity-UBER Pointer of the associated Data-UBER is invalid (i.e., this UBER wasn't previously assigned with a Parity-UBER), skip the below steps (i.e. don't calculate and write additional parity)
   c. Calculate the parity of the first half drives, $P_{h1}$.
   d. Calculate the parity of the second half, $P_{h2}$.
   e. Calculate the PLB parity using $P_{h1}$ and $P_{h2}$: $P_{plb}=P_{h1}+P_{h2}$ ('+' indicates XOR calculation).
   f. Write the parity Pob to the parity drive (as normally done).
   g. Write the parity of the first half Phi to the corresponding drive in the Parity-UBER "PU1".
   h. Set the Pvalid bit for "PLB1" (if supported).
   i. Note: If the system is highly loaded, the additional parity may be skipped to avoid a possible performance hit.
4) Garbage Collection (GC):
   a. The new PLB will be written with additional parity, in the same manner as described in the Flush operation.
   b. The Old PLBs involved in the GC operation will normally be freed. Therefore, clear their PValid bits in the PLB descriptors.
5) Rebuild: When a drive fails, and in any other scenario where the system needs to recover a PLB (e.g., disk hiccup), instead of calculating the full recovery, the system first checks if the data can be recovered in the fast route, using the additional parity:
   a. If the corresponding Data-UBER (for the current PLB) has an invalid Parity-UBER Pointer, there's no additional parity, and we fallback to the normal recovery.
   b. If the corresponding Data-UBER has a valid Parity-UBER pointer, check the PValid bit for the current PLB. If it's cleared, the PLB doesn't have an additional parity and we fallback to the normal recovery.
   c. If the PValid bit for the current PLB is set, then the additional parity is used, which requires reading only half the data:
   d. If the failed drive is part of the first half of the Data-UBER, then the partial parity is used, just as if it was a K/2+1 scheme.
   e. If the failed drive is in the second half, XOR the full parity with the partial parity to get the parity of the second half. Then use the calculated parity just as if it was a K/2+1 scheme.
   f. In case the failed drive is the parity drive in the Data-UBER, it may also be efficiently recovered by reading only the data in the second half, and XOR it with the additional parity of the first half.
6) Free Parity-UBER: When a new Data-UBER needs to be allocated but there are no free UBERs left, a Parity-UBER needs to be deallocated to be used as a Data-UBER:
   a. Remove the tail Parity-UBER from the Parity-UBERs list.
   b. Go over its back pointers, for each valid back pointer:
      i. Set the Parity-UBER pointer of the corresponding Data-UBER to invalid.
      ii. Clear all PLB Pvalid bits of the corresponding Data-UBER.
   c. Set all back pointers to invalid.
   d. Clear the IsParityUber flag.
   e. Return the Uber to the pool of free UBERs, to be allocated as new Data-UBER.

Note:

1) For an 8+1 scheme, each Parity-UBER includes space for 9 different Data-Ubers, as the system consists of 9 drives. In a general case of a K+1 scheme, each UBER includes space for (K+1) Data Ubers.
2) The described solution refers but not limited to K+1 scheme that uses XOR calculation for the parity. The same solution holds for a K+2 RAID scheme, when one of the 2 parities is the bitwise XOR calculation.

It should be appreciated that there is not any real cost for the additional parity calculation, but instead the order of the calculation is modified. There is an additional write which is performed with no or minimal impact on the system performance.

In accordance with certain embodiments, the system benefits both from efficient space utilization of using K+1 scheme, and most of the time, from efficient data recovery time and rebuild duration of a K/2+1 scheme which improves the system integrity and reliability.

In accordance with certain embodiments, when a drive fails, the system needs to guarantee it has enough free space to write the recovered data. Thus, the system reserves a "rebuild reservation" space that is kept free and is used only when the system performs rebuild. The "rebuild reservation" space is used for the additional parity. Using this space involves certain modifications such as updating the pointer from the Data-UBER to point to either a Parity-UBER or to allocated space in the "rebuild reservation".

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of protecting user data within a storage system, the method comprising:
 in response to a request signal that directs the storage system to store the user data, generating first parity and second parity based on the user data;
 storing the first parity and the user data in a data uber of the storage system, the data uber providing redundant array of independent disks (RAID) protection; and
 storing the second parity in designated free storage of the storage system, the designated free storage being separate from the data uber,
 wherein the second parity is stored in a parity uber that is separate from the data uber; and wherein the method further comprises:
 detecting an event in which there are no free data ubers left within the storage system, and
 in response to the event, invalidating the second parity stored in the parity uber and freeing the parity uber for use as another data uber.

2. A method as in claim 1 wherein the user data resides within K user data segments, K being a positive integer that is greater than or equal to 2; and
 wherein generating the first parity and the second parity based on the user data includes:
  calculating, as at least a portion of the first parity, a parity segment based on all of the K user data segments.

3. A method as in claim 2 wherein the K user data segments includes a first group of user data segments and a second group of user data segments, the second group being different from the first group; and
 wherein calculating the parity segment includes:
  calculating a first bitwise XOR segment based on the first group of user data segments,
  calculating a second bitwise XOR segment based on the second group of user data segments, and
  calculating the parity segment based on the first bitwise XOR segment and the second bitwise XOR segment.

4. A method as in claim 3 wherein each of the first group of user data segments and the second group of user data segments includes exactly K/2 user data segments.

5. A method as in claim 3 wherein the data uber is formed from storage on multiple storage devices of the storage system; and
 wherein storing the first parity and the user data in the data uber of the storage system includes:
  writing the parity segment and the K user data segments as at least a portion of a stripe within the data uber, each segment of the parity segment and the K user data segments being written to storage on a different storage device of the multiple storage devices of the storage system.

6. A method as in claim 3 wherein storing the second parity in the designated free storage of the storage system includes:
 writing, as the second parity, the first bitwise XOR segment to the parity uber.

7. A method as in claim 1 wherein a stripe in the data uber includes (i) user data segments having the user data and (ii) a first parity segment having the first parity; and
 wherein the method further comprises:
  in response to a storage device failure in which a segment of the stripe is lost, performing a rebuild operation that constructs a replacement segment that replaces the segment of the stripe that is lost from less than all of the remaining segments of the stripe.

8. A method as in claim 7 wherein the stripe includes exactly K user data segments, K being a positive integer;
 wherein a particular user data segment of the K user data segments of the stripe is lost; and
 wherein performing the rebuild operation includes:
  reading exactly K/2 user data segments of the stripe and the first parity segment of the stripe, and
  constructing the replacement segment based on only the K/2 user data segments and the first parity segment.

9. A method as in claim 7 wherein the stripe includes exactly K user data segments, K being a positive integer;
 wherein a particular user data segment of the K user data segments of the stripe is lost; and
 wherein performing the rebuild operation includes:
  reading exactly K/2 user data segments of the stripe, the first parity segment of the stripe, and a second parity segment having the second parity from the designated free storage, and
  constructing the replacement segment based on only the K/2 user data segments, the first parity segment, and the second parity segment.

10. A method as in claim 7 wherein the stripe includes exactly K user data segments, K being a positive integer;
 wherein the first parity segment of the stripe is lost; and
 wherein performing the rebuild operation includes:
  reading exactly K/2 user data segments of the stripe and a second parity segment having the second parity from the designated free storage, and
  constructing the replacement segment based on only the K/2 user data segments and the second parity segment.

11. A method as in claim 1, further comprising:
 creating a plurality of data ubers on storage devices of the storage system; and
 creating a plurality of uber descriptors that describes the plurality of data ubers.

12. A method as in claim 11 wherein each of the plurality of uber descriptors describes a respective data uber of the plurality of data ubers and includes:
 a type field constructed and arranged to indicate whether the respective data uber is regular uber that stores parity and user data, or a parity uber that exclusively stores parity;
 a parity uber field constructed and arranged to store a pointer to a parity uber when the respective data uber is a regular uber; and
 a set of backpointer fields constructed and arrange to store a set of backpointers to regular ubers when the respective data uber is a parity uber.

13. A method as in claim 12, further comprising:
 initializing each of the plurality of uber descriptors to indicated that each of the plurality of data ubers is initially a regular uber.

14. A method as in claim 13, further comprising:
 after each of the plurality of uber descriptors is initialized and prior to generating the first parity and the second parity, updating contents of a type field of an uber descriptor to indicate that a particular data uber has been converted from a regular uber to a parity uber, the second parity then being stored in the particular data uber.

15. A method as in claim 1 wherein the storage system includes a log-based storage structure; and wherein storing the first parity and the user data in the data uber of the storage system includes:
  writing the first parity and the user data into the log-based storage structure as part of a background garbage collecting service.

16. A method as in claim 1 wherein the storage system is constructed and arranged to perform data storage operations on behalf of a set of external host computers;
  wherein the user data includes host data from the set of external host computers; and
  wherein the method further comprises:
    providing the request signal that directs the storage system to store the user data in response to receiving the host data from the set of external host computers.

17. Storage system equipment, comprising:
  memory; and
  control circuitry coupled to the memory, the memory storing instructions which, when carried out by the control circuitry, cause the control circuitry to perform a method of:
    in response to a request signal that directs a storage system to store the user data, generating first parity and second parity based on user data,
    storing the first parity and the user data in a data uber of the storage system, the data uber providing redundant array of independent disks (RAID) protection, and
    storing the second parity in designated free storage of the storage system, the designated free storage being separate from the data uber,
    wherein the second parity is stored in a parity uber that is separate from the data uber; and wherein the method performed by the control circuitry further includes:
      detecting an event in which there are no free data ubers left within the storage system, and
      in response to the event, invalidating the second parity stored in the parity uber and freeing the parity uber for use as another data uber.

18. A computer program product having a non-transitory computer readable medium which stores a set of instructions to protect user data within a storage system; the set of instructions, when carried out by computerized circuitry, causing the computerized circuitry to perform a method of:
  in response to a request signal that directs the storage system to store the user data, generating first parity and second parity based on the user data;
  storing the first parity and the user data in a data uber of the storage system, the data uber providing redundant array of independent disks (RAID) protection; and
  storing the second parity in designated free storage of the storage system, the designated free storage being separate from the data uber,
  wherein the second parity is stored in a parity uber that is separate from the data uber; and wherein the method performed by the computerized circuitry further includes:
    detecting an event in which there are no free data ubers left within the storage system, and
    in response to the event, invalidating the second parity stored in the parity uber and freeing the parity uber for use as another data uber.

19. Storage system equipment as in claim 17, wherein the method performed by the control circuitry further includes:
  creating a plurality of data ubers on storage devices of the storage system; and
  creating a plurality of uber descriptors that describes the plurality of data ubers,
  wherein each of the plurality of uber descriptors describes a respective data uber of the plurality of data ubers and includes:
    a type field constructed and arranged to indicate whether the respective data uber is regular uber that stores parity and user data, or a parity uber that exclusively stores parity;
    a parity uber field constructed and arranged to store a pointer to a parity uber when the respective data uber is a regular uber; and
    a set of backpointer fields constructed and arrange to store a set of backpointers to regular ubers when the respective data uber is a parity uber.

20. A computer program product as in claim 18, wherein the method performed by the computerized circuitry further includes:
  creating a plurality of data ubers on storage devices of the storage system; and
  creating a plurality of uber descriptors that describes the plurality of data ubers,
  wherein each of the plurality of uber descriptors describes a respective data uber of the plurality of data ubers and includes:
    a type field constructed and arranged to indicate whether the respective data uber is regular uber that stores parity and user data, or a parity uber that exclusively stores parity;
    a parity uber field constructed and arranged to store a pointer to a parity uber when the respective data uber is a regular uber; and
    a set of backpointer fields constructed and arrange to store a set of backpointers to regular ubers when the respective data uber is a parity uber.

* * * * *